United States Patent
Zuo et al.

(10) Patent No.: US 8,885,288 B2
(45) Date of Patent: Nov. 11, 2014

(54) SHROUDING A DATA STORAGE DISC WITH DISC FACING SURFACES THAT DEFINE PROTUBERANT FEATURES

(75) Inventors: Xu Zuo, Prior Lake, MN (US); Xiaohong Sun, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 1431 days.

(21) Appl. No.: 11/957,432

(22) Filed: Dec. 15, 2007

(65) Prior Publication Data
US 2009/0154018 A1 Jun. 18, 2009

(51) Int. Cl.
 *G11B 33/14* (2006.01)
 *G11B 25/04* (2006.01)
 *H05K 7/20* (2006.01)

(52) U.S. Cl.
 CPC .......... *G11B 25/043* (2013.01); *G11B 33/148* (2013.01)
 USPC .................................................. 360/97.14

(58) Field of Classification Search
 USPC .......... 360/97.02, 97.03, 97.15, 97.14, 97.12, 360/97.13
 See application file for complete search history.

(56) References Cited

U.S. PATENT DOCUMENTS

| | | | | |
|---|---|---|---|---|
| 4,280,155 A * | 7/1981 | Scott et al. | .................. | 360/97.03 |
| 5,453,890 A * | 9/1995 | Takegami et al. | .......... | 360/97.02 |
| 5,748,609 A | 5/1998 | Tanaka | | |
| 6,407,879 B1 * | 6/2002 | Fruge' et al. | ............... | 360/99.17 |
| 6,665,139 B2 * | 12/2003 | Tokuyama et al. | ........ | 360/97.02 |
| 6,788,493 B1 * | 9/2004 | Subramaniam et al. | ... | 360/97.02 |
| 6,903,899 B2 | 6/2005 | Sakata et al. | | |
| 6,937,433 B2 * | 8/2005 | Dahlenburg et al. | ...... | 360/97.03 |
| 6,975,483 B2 * | 12/2005 | Choi et al. | .................. | 360/97.02 |
| 7,031,104 B1 * | 4/2006 | Butt et al. | ................... | 360/97.02 |
| 7,064,921 B1 | 6/2006 | Yang et al. | | |
| 7,072,140 B2 * | 7/2006 | Asano et al. | ............... | 360/97.02 |
| 7,085,098 B1 | 8/2006 | Yang et al. | | |
| 7,106,553 B2 | 9/2006 | Kim | | |
| 7,133,238 B2 * | 11/2006 | Tadepalli et al. | ............... | 360/75 |
| 7,133,249 B2 | 11/2006 | Miyajima | | |
| 7,283,324 B2 * | 10/2007 | Sasaki | ......................... | 360/97.03 |
| 7,382,571 B2 * | 6/2008 | Zuo et al. | ................... | 360/97.02 |
| 7,420,775 B2 * | 9/2008 | Lim | ............................. | 360/97.03 |
| 7,593,181 B1 * | 9/2009 | Tsay et al. | .................. | 360/97.03 |
| 7,787,213 B1 * | 8/2010 | Michael et al. | ............. | 360/97.03 |
| 2002/0097525 A1 * | 7/2002 | Rao et al. | .................... | 360/244.2 |
| 2002/0181148 A1 * | 12/2002 | Dahlenburg et al. | ....... | 360/97.02 |
| 2003/0117746 A1 | 6/2003 | Kovinskaya et al. | | |
| 2003/0151848 A1 * | 8/2003 | Lee | ............................. | 360/97.02 |
| 2003/0156351 A1 * | 8/2003 | Voights et al. | ............. | 360/97.02 |
| 2003/0179493 A1 | 9/2003 | Kim | | |
| 2005/0185325 A1 * | 8/2005 | Hur | ............................. | 360/97.02 |
| 2005/0190488 A1 * | 9/2005 | Chan et al. | .................. | 360/97.02 |
| 2005/0195521 A1 * | 9/2005 | Alonso et al. | .............. | 360/97.02 |
| 2005/0195522 A1 * | 9/2005 | Alonso et al. | .............. | 360/97.02 |
| 2006/0002007 A1 * | 1/2006 | Lee et al. | .................... | 360/97.02 |
| 2006/0028760 A1 * | 2/2006 | Zuo et al. | .................... | 360/97.02 |
| 2006/0066993 A1 * | 3/2006 | Agematsu et al. | .......... | 360/97.03 |
| 2006/0114603 A1 * | 6/2006 | Ser et al. | ..................... | 360/97.02 |
| 2006/0139797 A1 * | 6/2006 | Suzuki et al. | .............. | 360/97.02 |
| 2008/0151420 A1 * | 6/2008 | Lee et al. | .................... | 360/97.02 |

* cited by examiner

*Primary Examiner* — Julie Anne Watko
(74) *Attorney, Agent, or Firm* — Hall Estill Attorneys at Law

(57) ABSTRACT

Shrouding a disc to attenuate excitation energy of windage created by rotating the disc, with a shroud defining an edge-wise gap between the shroud and the disc, and the shroud further defining surface-wise gaps between the shroud and opposing disc surfaces, wherein the surface-wise gaps are characterized by opposing parallel surfaces having protuberant features depending therefrom toward each other that define minimum clearances with the disc surfaces.

18 Claims, 6 Drawing Sheets

SHROUDING A DATA STORAGE DISC WITH DISC FACING SURFACES THAT DEFINE PROTUBERANT FEATURES

BACKGROUND

Moving media data storage devices such as disc drives are commonly used in a multitude of computer environments to store large amounts of data in a form that is readily available. Generally, a disc drive has one or more storage discs that are rotated by a motor at high speeds. Each disc has a data storage surface divided into data tracks where data is stored, such as in the form of magnetic flux transitions. A data transfer member is moved by an actuator to selected positions adjacent the data storage surface to sense the magnetic flux transitions in reading data from the disc, and to transmit electrical signals to induce the magnetic flux transitions in writing data to the disc.

The active elements of the data transfer member are supported by suspension structures extending from the actuator. The active elements are maintained a small distance from the data storage surface by a fluid bearing generated by fluid currents caused by the spinning discs. The term "fluid bearing" is synonymous with the term "air bearing" where the fluid utilized in the disc drive is air. Alternatively, the term "fluid bearing" is applicable to other embodiments utilizing a fluid other than air, such as helium.

A continuing trend in the data storage industry is ever-increasing the disc drive data storage capacity and processing speed while maintaining or reducing its physical size. Consequently, modern data transfer members and supporting structures are miniaturized, making them more susceptible to external excitation and unacceptable vibration. For instance, data storage densities being significantly higher than in the past, vibrations that were once ignored as negligible must now be addressed because of an overall increased sensitivity to vibration as a percentage of track width.

One source of excitation is the fluid currents from the spinning discs that impinge against the actuator and/or the rotating disc. During servo track writing operations, for example, vibrations from such excitation can result in actuator positional control errors and irregular servo track formatting, such as but not limited to track squeeze.

In some previously attempted solutions a shroud is used to encompass a portion of the disc as it rotates. The shroud has plates extending in close mating engagement with opposing data storage surfaces of the disc. The plates divert a greatest majority portion of the fluid currents away from the actuator to prevent them from impinging against the actuator and causing vibration. The fluid currents that flow through the shroud and ultimately impinge the actuator are straightened and non-turbulent. The pressurized fluid advantageously attenuates vibration in the disc.

The success with which the fluid excitation energy can be attenuated is directly related to minimizing the clearances between the stationary plates and the rotating disc. Ultimately, however, there is a finite limit to minimizing those clearances while ensuring that no contacting engagement occurs. In view of the limitations in the existing art, the claimed embodiments are directed to needed improvements in attenuating windage excitation energy.

SUMMARY

Shrouding a disc to attenuate excitation energy of windage created by rotating a disc, with a shroud defining an edge-wise gap between the shroud and the disc, and the shroud further defining surface-wise gaps between the shroud and opposing disc surfaces, wherein the surface-wise gaps are characterized by opposing parallel surfaces having protuberant features depending therefrom toward each other that define minimum clearances with the disc surfaces.

In some embodiments a shroud is provided having an arcuate edge surface sized to facingly engage an edge of a disc operably disposed in the shroud to define a constant edge-wise gap entirely along the arcuate edge surface. Opposing plates defining respective first and second parallel plate surfaces extend from the arcuate edge surface and form an upstream inlet with respect to a direction that the disc operably rotates. Opposing protuberant members depend from the first and second plate surfaces and terminate at distal third and fourth surfaces defining a gap smaller than the inlet but sized to operably receive the disc.

In some embodiments a method is provided that includes steps of: admitting only a first portion of fluid currents created by a rotating disc into an inlet of a shroud encompassing both opposing planar surfaces and a contiguous edge of the disc in close mating engagements, the shroud configured for attenuating excitation energy of fluid in a flowpath through the shroud that impingingly engages a data transfer member downstream of the shroud; and passing only a second portion of the first portion of fluid currents from the inlet through a gap between the shroud and the disc that is downstream of and smaller than the inlet, wherein fluid currents in the first portion but not in the second portion are radially diverted in the inlet out of the shroud and away from the data transfer member.

In some embodiments a system is provided including a rotatable disc and means for attenuating excitation on a member acting on the disc, caused by windage created by rotating the disc, by progressively diverting portions of the windage away from the member and by reducing the excitation energy of the portions not diverted away.

DETAILED DESCRIPTION

Figure 1:
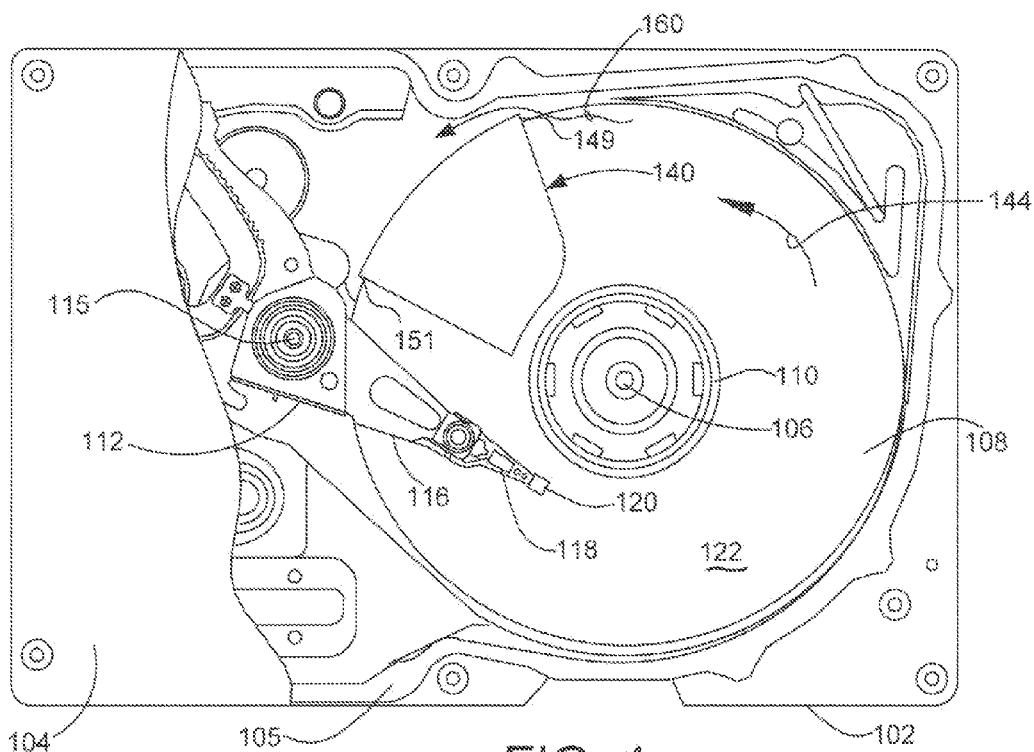
FIG. 1 is a plan view of a data storage device that is constructed in accordance with the claimed embodiments.

Referring to the drawings in general, and for now more particularly to FIG. 1 that depicts a plan view of a data storage device 100 that is constructed in accordance with the claimed embodiments. The data storage device 100 includes a base 102 to which various disc drive components are mounted, and a cover 104 (partially cutaway) which together with the base 102 and a perimeter gasket 105 form an enclosure providing a sealed internal environment for the components.

Figure 3:
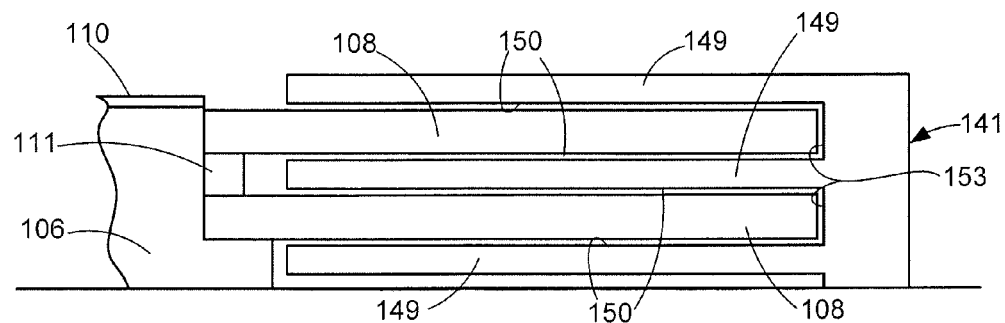
FIG. 3 is a cross sectional view of a shroud that is constructed in accordance with related art solutions.

Mounted to the base 102 is a motor 106 to which one or more discs 108 are stacked and secured by a clamp ring 110 for rotation at a high speed. Where a plurality of discs 108 are stacked to form a disc stack, adjacent discs 108 are typically separated by a disc spacer 111 (FIG. 3). A data transfer member such as an actuator 112 pivots around a pivot bearing 115 in a plane parallel to the discs 108. The actuator 112 has actuator arms 116 (only one shown in FIG. 1) that support load arms 118 in travel across the discs 108. The load arms 118 are flex members that support data transfer elements, such as read/write heads 120, with a data reading and writing relationship. This relationship is maintained by a slider (not shown) which operably supports the head 120 on a fluid bearing sustained by fluid currents generated by the spinning discs 108. In some embodiments the fluid can be air; in other embodiments the fluid can be something other than air, such as but not limited to helium.

Each of the discs 108 has a data storage region comprising a data recording surface 122. In some embodiments the head 120 is used to write servo information defining the track location; this is referred to as "in-situ" servo track writing. In other embodiments the servo information is prewritten to the discs 108 before they are installed into the data storage device 100; this is referred to as "ex-situ" servo track writing and is discussed below. The data tracks can be defined in various arrangements, such as being concentric or spiraled. In addition to in-situ servo track writing, the heads 120 are subsequently positioned adjacent a desired data track, from servo information feedback, in reading user data from and writing user data to the data storage surface 122.

As noted earlier, the motor 106 spins the discs 108 at a high speed while the head 120 writes to and/or reads from the data storage surface 122. The kinetic energy of the spinning discs 108 is transferred by friction to the fluid at the disc/fluid boundary layer, thereby imparting a force vector to the fluid. The combined rotational and centrifugal forces from the spinning discs 108 create a generally outwardly spiraling flow to the fluid surrounding the discs 108. This fluid flow, or windage, can excite the disc 108 and the actuator 112, causing vibration. The excitation energy can be attenuated to a level below an acceptable threshold level by practicing the claimed embodiments.

In the illustrative embodiments of FIG. 1, the direction of disc 108 rotation is indicated by reference number 144. A shroud 140 is disposed immediately upstream of the actuator 112, with respect to the direction of rotation 144, for the purpose of attenuating the excitation energy of windage created by the disc 108 rotation that would otherwise impingingly engage against the actuator 112. The shroud 140 being disposed immediately upstream of the actuator 112 "strips away" the greatest majority of the windage, so it is also commonly referred to as an airflow stripper.

Figure 2:
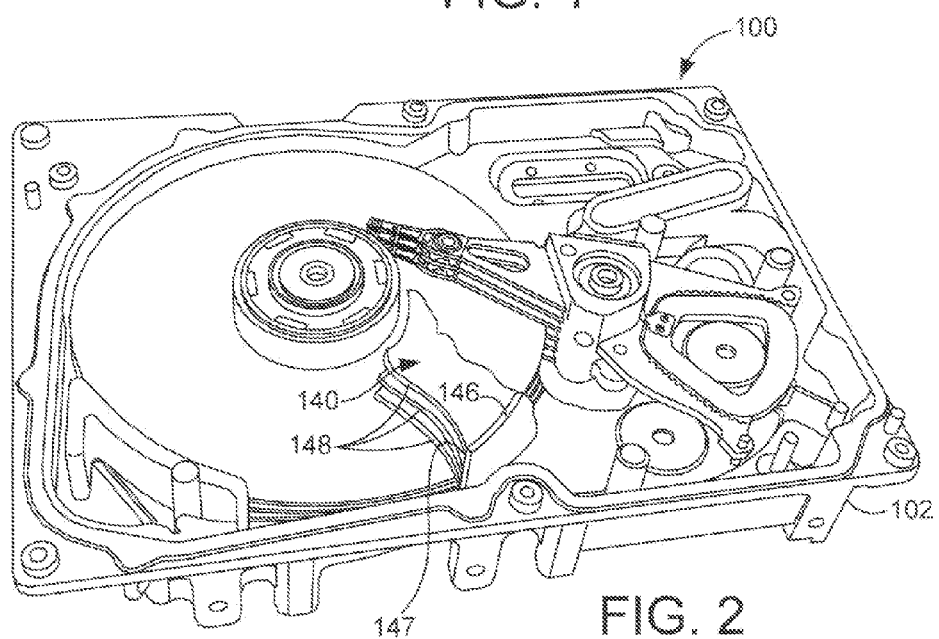
FIG. 2 is a partially cutaway isometric view of the data storage device of FIG. 1.

FIG. 2 is an isometric view of the data storage device 100 with two discs 108 removed from a disc stack for better viewing of the shroud 140. The shroud 140 has a body 146 and a number of disc plates 148 extending from the body 146. The body 146 can be readily adapted for fastening to the base 102, such as but not limited to by the use of fasteners (not shown). The body 146 defines an arcuate edge surface 147 that is sized to facingly engage an edge of the disc 108 to define a constant edge-wise gap therebetween entirely along the arcuate edge surface 147, from a leading edge 149 (FIG. 1) of the shroud 140 to a trailing edge 151 (FIG. 1) of the shroud 140. Preferably, the size of the edge-wise gap is associated with a maximum expected non-concentricity of the disc 108 during rotation, such as resulting from biasing the discs 108 against the motor 106 to balance the rotating mass of a disc stack, and a desired tolerance to prevent contacting engagement between the shroud 140 and the disc 108.

The disc plates 148 are spatially separated from each other, defining gaps therebetween for receivingly encompassing respective portions of the discs 108 in non-contacting engagements during rotation. Each plate 148 is generally parallel to the respective data storage surface of the disc 108. The gaps between each disc plate 148 and the respective data storage surface of the disc 108 are minimized to the extent possible, depending on the maximum expected flutter, or out of plane motion, of the disc 108 during rotation. The flow restriction through the shroud 140 strips away, or diverts, a greatest majority portion 160 (FIG. 1) of the fluid currents to prevent them from impingingly engaging the actuator altogether.

As for the fluid currents entering the gaps between the shroud 140 and the disc 108, the disc plates 148 straighten that flow and reduce its excitation energy before it impingingly engages against the actuator 112. The flow through the shroud 140 is statically pressurized to the extent that the fluid is squeezed into and constrained within the gaps between the disc 108 and the shroud 140, thereby straightening and slowing the flow. The close mating edge-wise engagement provides for disc edge damping by preventing the fluid currents from exiting the shroud 140 adjacent the disc edge. The fluid flowing through the shroud outlet is non-turbulent to minimize its effect in imparting vibration to the actuator 112.

FIG. 3 is an elevational view of an illustrative related art shroud 141 having a plurality of disc plates 149 defining planar surfaces 150 disposed adjacent to and in close mating relationship with respective recording surfaces of the discs 108. The arcuate edge surface 153, like the arcuate edge surface 147 in FIG. 2, defines a constant edge-wise gap with the edge of the disc 108. In these previously attempted solutions the size of the surface-wise gaps between the disc 108 and the surfaces 150 are as small as possible. However, the rule of diminished returns has been reached in those attempted solutions, in that several factors effectively limit how small the gaps can be. Those factors include such things as component tolerances and assembly stack tolerances, as well as motor 106 and disc 108 runnout.

Figure 4A:
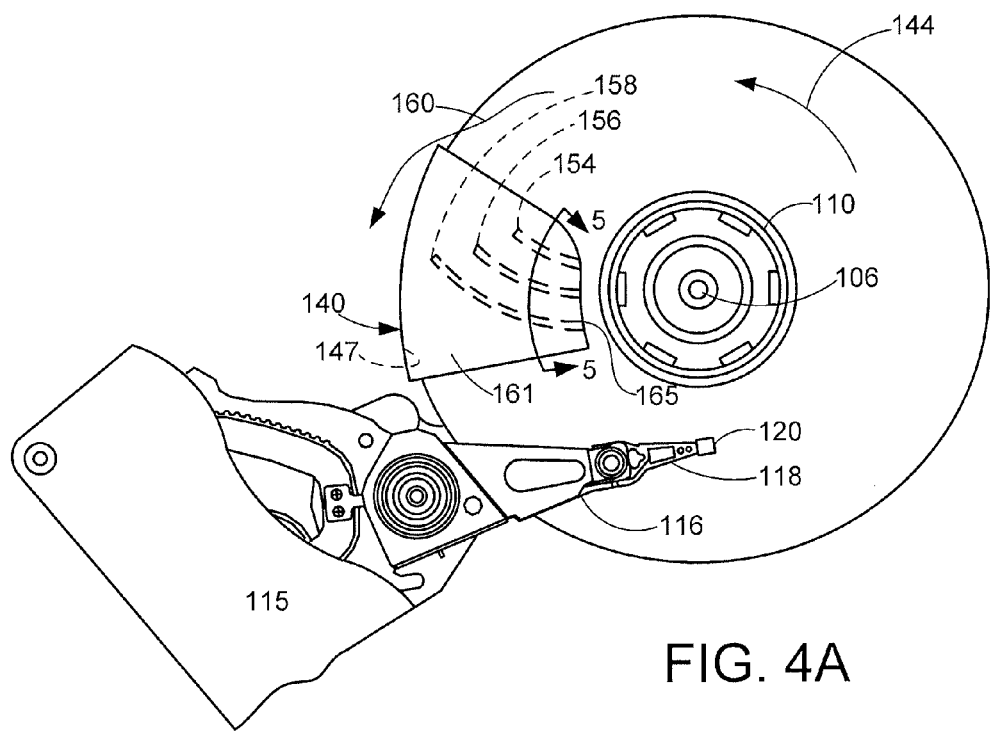
FIG. 4A depicts a portion of the data storage device of FIG. 1.

FIG. 4A depicts a portion of the data storage device 100 of FIG. 1 with the shroud 140 that is constructed in accordance with the claimed embodiments. With additional respect to FIG. 5A, the shroud 140 has opposing plates 161, 161' defining respective first and second parallel plate surfaces 164, 164' contiguous with and extending from the arcuate edge surface 147 adjacent an outer diameter of the disc 108. The plate surfaces 164, 164' terminate at a plate edge 165 adjacent an inner diameter of the disc 108, and form a gap therebetween defining a shroud inlet around the disc 108 with respect to the direction of rotation 144.

In the illustrative embodiments depicted the shroud 140 defines a pair of opposing protuberant members 154 and 154' extending from the respective plate surfaces 164, 164', and additional opposing protuberant members 156, 156' and 158, 158'. Each pair of opposing protuberant members terminates at distal ends to define a gap smaller than the inlet but yet sized to operably receive the disc 108 in a non-contacting engagement therewith. Unlike the related art depicted in FIG. 3, only the gaps defined by the opposing protuberant members are sized in relation to an expected maximum out of plane motion during disc rotation and a desired tolerance to prevent contacting engagement between the shroud and the disc 108.

The use of three pairs of protuberant members in FIG. 4A is merely illustrative and not limiting of the claimed embodiments, because in equivalent alternative embodiments more or fewer than three pairs can be used. Note also that in the depicted illustrative embodiments the paired protuberant members are disposed in a mirrored arrangement with respect to each other across the gap they form. However, in equivalent alternative embodiments they could not be so mirrored, such as by being staggered with respect to each other.

Figure 4B:
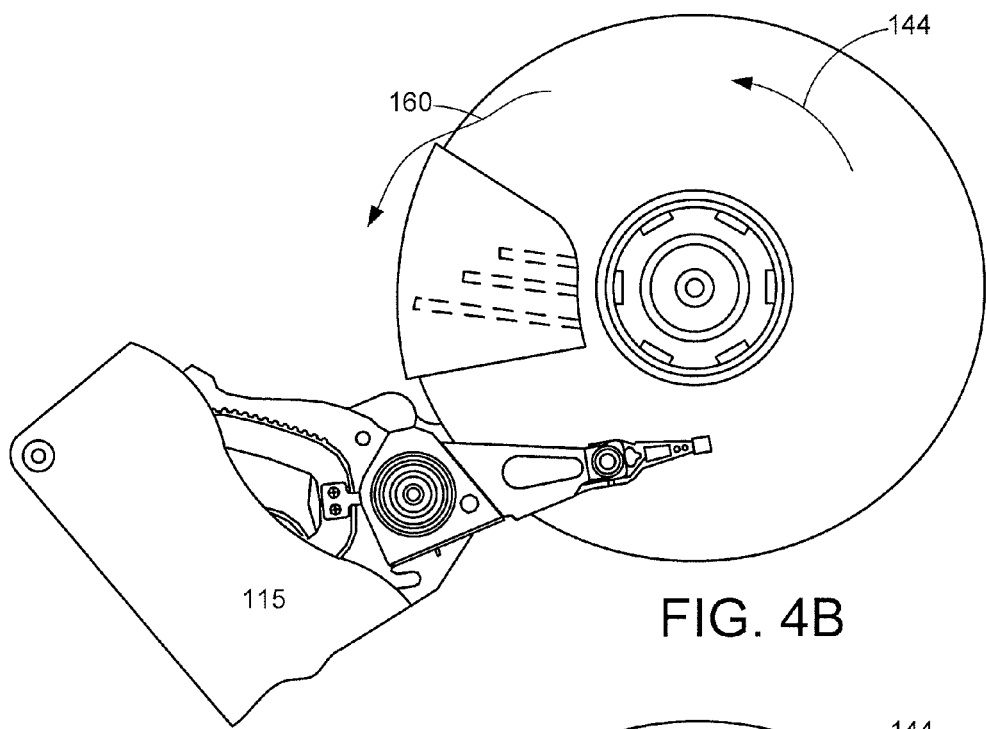
FIGS. 4B and 4C are views similar to FIG. 4A but depicting equivalent alternative embodiments.
Figure 4C:
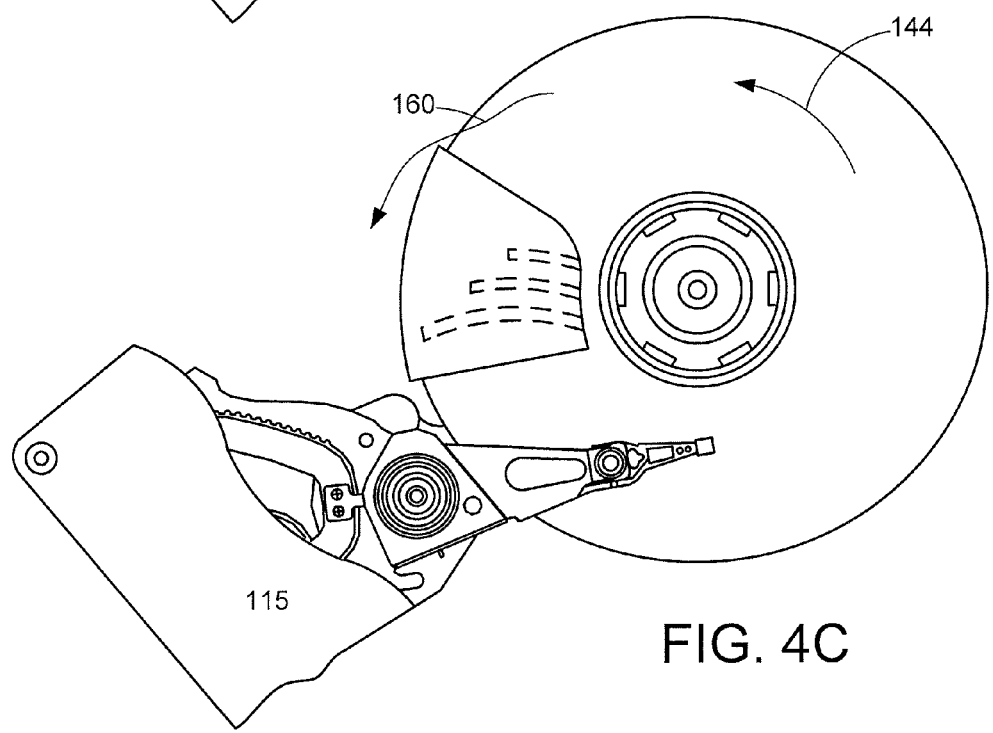

The protuberant members 154, 156, 158 have respective proximal ends adjacent the plate edge 165 and extend laterally along a substantially radial path of the disc 108. In the embodiments depicted by FIG. 4A, more particularly, each of the illustrative protuberant members 154, 156, 158 extends laterally along arcuate axes that dispose the protuberant member orthogonal to the outwardly spiraling fluid currents at each of different radial disc locations. In this arrangement the fluid currents impinge the shroud inlet squarely, maximizing the static pressurization of the fluid in the inlet. In alternative embodiments the protuberant members can be straight (FIG. 4B) or can arcuately bend away from the outwardly spiraling fluid currents (FIG. 4C), which tends to relatively lessen the pressurization of the fluid entering the inlet. In other embodiments not depicted two or more different protuberant member configurations can be used in a combination. The number, size, and shape of the protuberant members can be selected to provide a desired characteristic attenuation of the windage excitation energy.

Note also in the illustrative embodiments of FIG. 4A that the downstream protuberant members 154, 156, 158 are progressively longer. That means some of the fluid currents entering the inlet will flow past the first protuberant member 154 unencumbered and impingingly engage the second or third protuberant members 156, 158. This advantageously distributes the fluid currents to all the radial channels defined by the protuberant members, whereas in each of which a portion of the fluid currents migrate out of the shroud 152 toward the low pressure region at the center of the rotating disc 108. Those fluid currents migrating out of the shroud 152 are thus advantageously diverted away from and thereby do not excite the actuator 112.

Figure 5A:
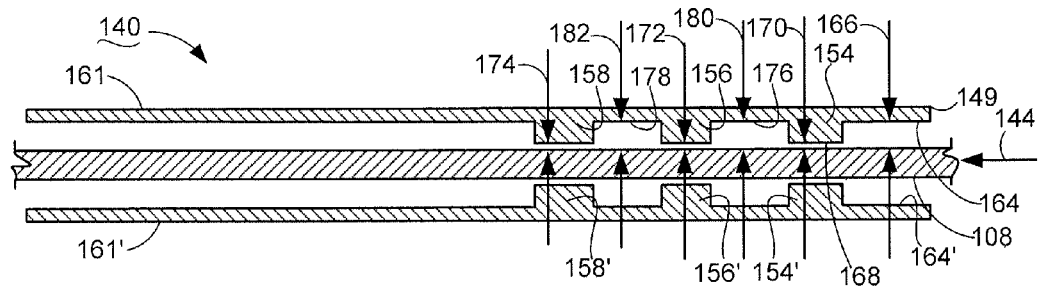
FIG. 5A is a cross sectional view along the section line 5-5 in FIG. 4A.

FIG. 5A is a cross sectional view of the shroud 140 along the section line 5-5 in FIG. 4A. The first plate surface 164 is substantially parallel to the disc 108 and forms a first gap 166 with the disc 108 defining the half of the inlet above the disc 108. The protuberant member 154 terminates at a distal surface 168 that is likewise substantially parallel to the disc 108 and forms a gap 170 with the disc 108, that is smaller than the gap 166, defining the half of the reduced-gap flow restriction above the disc 108. The gap 170 is downstream of the inlet gap 166, meaning that at least a portion of the fluid currents entering the inlet then pass through the gap defined by the protuberant members 154, 154'.

In the illustrative embodiments of FIG. 5A the other two protuberant members 156, 158 likewise terminate at distal ends defining respective gaps 172, 174 that are substantially the same size as the gap 170. Those protuberant members 156, 158 extend from respective surfaces 176, 178 forming gaps 180, 182, respectively, that are substantially the same size as the gap 166. The illustrative equivalency of gaps 180, 182 to gap 166 means that surfaces 176, 178 are coextensive with the surface 164. However, this depiction is illustrative and not limiting of the claimed embodiments, because in equivalent alternative embodiments the gaps between the protuberant members may vary, and the gaps formed by the surfaces from which the protuberant members depend may vary. However, the gaps between each of the protuberant members are smaller than the gaps formed by the surfaces from which the protuberant members depend.

Figure 5B:
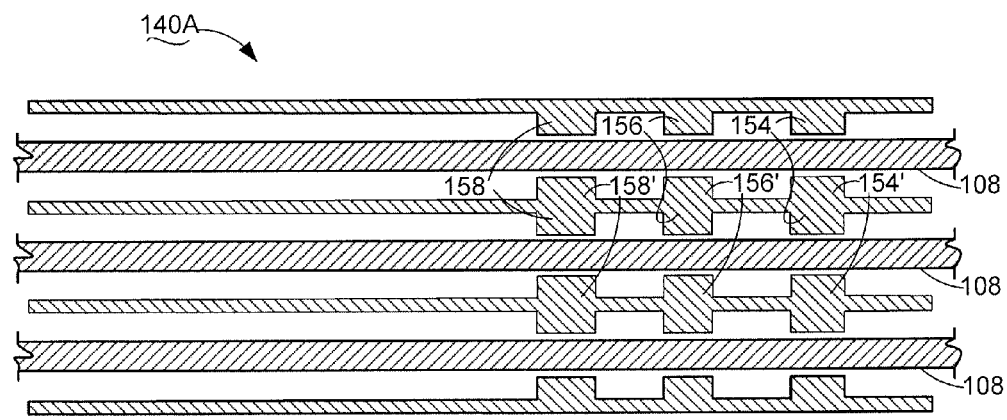
FIG. 5B is a view similar to FIG. 5A but for a data storage device having a disc stack made of three data storage discs.
Figure 6:
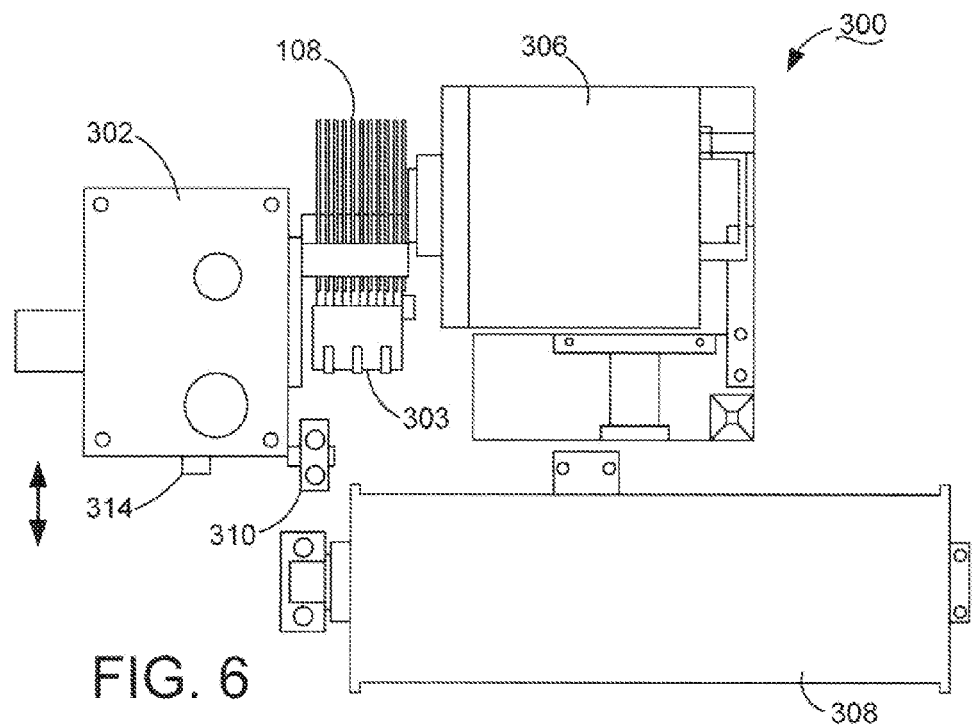
FIG. 6 is a plan view of a servo writer that is constructed in accordance with the claimed embodiments.
Figure 7:
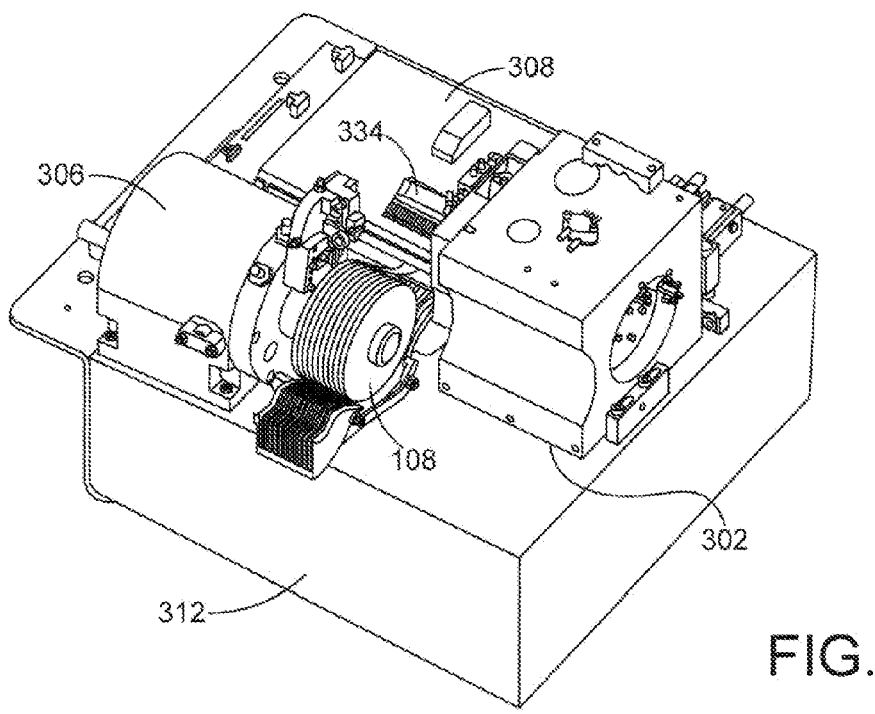
FIG. 7 is an isometric view of the servo writer of FIG. 6.
Figure 8:
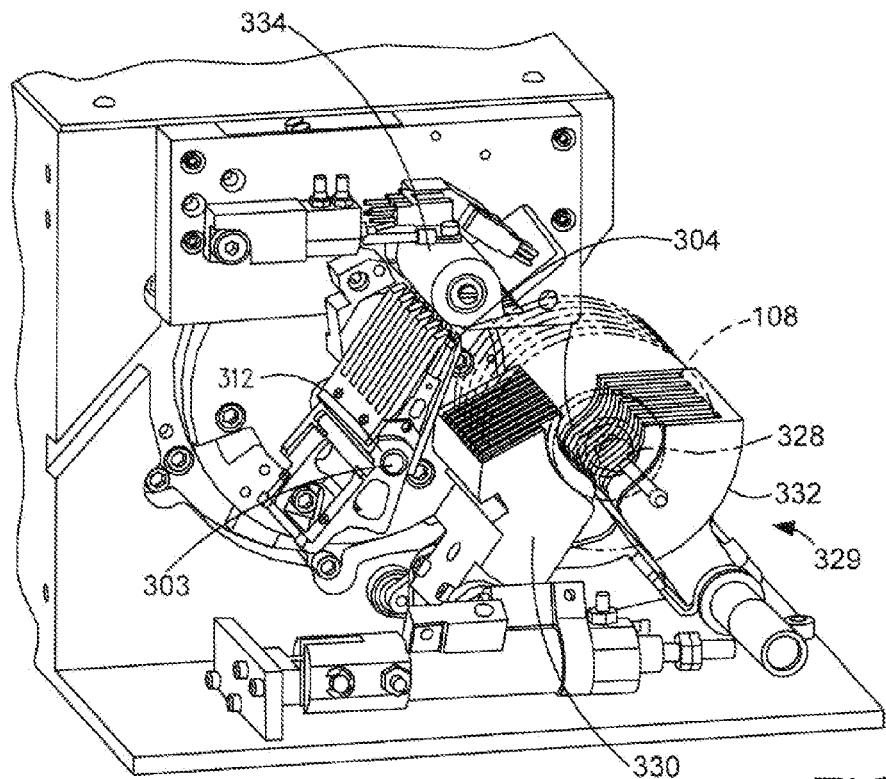
FIG. 8 is an isometric depiction of a portion of the servo writer of FIG. 6.

The shroud 140 pairs the disc plate 161 with the disc plate 161' on the opposing side of the same disc 108. In these illustrative embodiments the disc plate 161' defines surfaces that mirror the disc plate 161, forming opposing protuberant members 154', 156', 158'. The shroud 140 depicted in FIG. 5A partially encompasses a single disc 108. FIG. 5B depicts how in a disc stack (such as three discs 108), each disc 108 is encompassed by a shroud 140A having a plurality of the mirrored protuberant members 154, 156, 158 and 154', 156', 158' being associated with respective data storage surfaces of each of the plurality of discs 108.

Continuing now with respect to FIGS. 4A and 5A, the claimed embodiments contemplate a method for attenuating the excitation energy of the windage created by the rotating disc that impinges against the actuator 112. That method includes admitting only a first portion of the fluid currents created by the rotating disc into the shroud inlet, thereby diverting the greatest majority portion 160 of those fluid currents away from the actuator 112 altogether.

Of the first portion of fluid currents that does enter the inlet, only a second portion of that first portion passes through the gap defined by the distal ends of the protuberant members 154, 154'. The flow restriction created by the protuberant members 154, 154' impedes flow from the inlet into the reduced gap. This causes the flow currents in the first portion but not in the second portion to migrate radially through the channel between the inlet and the protuberant member 154 and out the shroud 140 toward the lower pressure zone at the center of disc rotation. Even some of the second portion of fluid currents will first migrate radially before entering the reduced gap to equalize pressure gradients existing across the channel.

Subsequent portions of the second portion of fluid currents similarly either pass through the downstream gaps defined by the other protuberant members, or otherwise migrate through the channels out of the shroud to the low pressure region at the center of disc rotation. Ultimately, the flow exiting the shroud 140 is a steady state laminar flow of a minimal excitation energy to prevent imparting vibrations to the actuator 112.

Turning now to FIGS. 6-9, the claimed embodiments are now addressed with regard to an ex-situ servo track writing device 300 that is used to write servo data information simultaneously to each of multiple discs 108. The device 300 includes an actuator assembly 302 for positioning an actuator 303 supporting servo recording heads 304 at a distal end thereof for recording the servo information. A motor 306 rotates the discs 108 with respect to the recording heads 304. A vacuum chuck 308 fixes the actuator assembly 302 in place between a selected one of a servo writing position shown in FIG. 8, and a load/unload position shown in FIG. 7. A laser interferometer 310 provides position control for the angular displacement of the servo recording heads 304.

A base 312, such as a granite slab, supports the device 300 components. A linear slide 314 constrains lateral movement of the actuator assembly 302 between the servo writing and the load/unload positions. With the actuator assembly 302 in the load/unload position (FIG. 7) a spindle hub 328 supporting the plurality of discs 108 is loaded to the motor 306.

Figure 9:
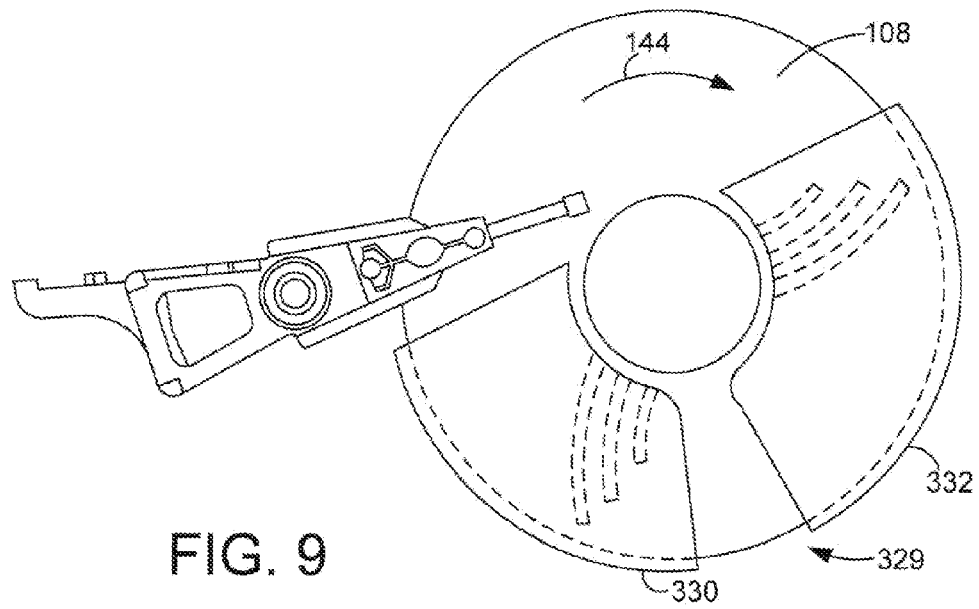
FIG. 9 is an elevational view of a portion of the servo writer of FIG. 6.

A two-piece shroud 329 in accordance with the claimed embodiments is segmented into a fluid stripper 330 portion and a fluid dam 332 portion that are selectively moveable between an extended position (shown in FIG. 8), whereat the shroud 329 encompassingly engages the discs 108 in the manner described above, and a retracted position (shown in FIG. 7) whereat the shroud 329 clearingly disengages the discs 108. FIG. 9 depicts each of the fluid stripper 330 and the fluid dam 332 defining arcuate protuberant members that orthogonally intersect the outwardly spiraling fluid currents like those described in FIG. 4A. In equivalent alternative embodiments the protuberant members defined by the stripper 330 and dam 332 can be straight or can bend away from the fluid currents like those depicted in FIGS. 4B and 4C, or some combination of these general types of protuberant members can be used. Although not shown, cross sectional views of the stripper 330 and dam 332 are like that depicted in FIG. 5B for the shroud 152A.

After the hub 328 is loaded to the motor 306, the fluid stripper 330 and the fluid dam 332 are articulated to partially encompass the plurality of discs 108. The actuator assembly 302 is then moved laterally by the slide 314 into operable engagement with the multi-disc stack. A comb 334 pivots to engage the plurality of servo recording heads 304 so that the actuator 303 can be loaded to the multi-disc stack. With the actuator 303 loaded, the motor 306 spins the multi-disc stack and servo track writing begins. As above, the stripper 330 and dam 332 attenuate the excitation energy of the outwardly spiraling fluid currents generated by the spinning discs 108.

Generally, the claimed embodiments contemplate a data storing device having a rotatable disc (such as 108) and means for attenuating excitation on a member acting on the disc, caused by windage created by rotating the disc, by progressively diverting portions of the windage away from the member and by reducing the excitation energy of the portions not diverted away. For purposes of this description and meaning of the appended claims the term "means for attenuating excitation" includes the disclosed structure and structural equivalents thereof that are capable of the same function. The disclosed structure includes the shroud (such as 140, 329) having the arcuate edge surface 147, the parallel plate surfaces 164, 164', and one or more protuberant members (such as 154, 154') depending from the plate surfaces and defining reduced gap flow restrictions on a flow path through the shroud. Particularly, the shroud surfaces create close facing engagements both edge-wise and surface-wise with opposing surfaces of the rotating disc. However, only a portion of the facing surface-wise engagement is at a minimum gap. The "means for attenuating excitation" expressly does not include the structure of previously attempted solutions wherein a shroud has a disc plate that is entirely disposed in the minimum gap facing engagement with the disc surface.

It is to be understood that even though numerous characteristics and advantages of various embodiments have been set forth in the foregoing description, together with details of the structure and function of various embodiments, this description is illustrative only, and changes may be made in detail, especially in matters of structure and arrangements of parts within the principles of the present embodiments to the full extent indicated by the broad general meaning of the terms in which the appended claims are expressed. For example, the particular elements may vary in type or arrangement without departing from the spirit and scope of the present embodiments.

In addition, although the embodiments described herein are described in relation to a rotating disc in a data storage device, it will be appreciated by those skilled in the art that the claimed subject matter is not so limited and various other spinning disc systems can utilize the present embodiments without departing from the spirit and scope of the claimed embodiments.

What is claimed is:

1. A shroud comprising:
    an arcuate edge surface sized to facingly engage an edge of a disc operably disposed in the shroud to define an edge-wise gap entirely along the arcuate edge surface;
    a plate having a plate surface extending from a proximal end that is contiguous to the arcuate edge surface to a distal end terminating at a plate edge nearer an inner diameter of the disc, a leading edge of the plate spaced from the disc by a first gap forming an upstream inlet with respect to a direction that the disc operably rotates;
    a first protuberant member depending from the plate surface and spaced from the disc by a second gap downstream of and smaller than the first gap the first protuberant member operably extending from adjacent the plate edge in a substantially radial direction across a portion of the disc; and
    a second protuberant member depending from the plate surface and spaced from the disc by a third gap downstream of the second gap and smaller than the first gap, the second protuberant member operably extending from adjacent the plate edge in a substantially radial direction across a portion of the disc and radially longer than the first protuberant member.

2. The shroud of claim 1 wherein the size of the edge-wise gap is greater than non-concentricity during disc rotation to prevent contacting engagement between the arcuate edge and the disc operably disposed in the shroud.

3. The shroud of claim 1 wherein the sizes of the gaps are greater than an out of plane motion during disc rotation to prevent contacting engagement between the plate surfaces and the disc operably disposed in the shroud.

4. The shroud of claim 1 comprising opposing protuberant members disposed on both sides of the disc.

5. The shroud of claim 4 wherein the opposing protuberant members are disposed in a staggered relationship with respect to each other.

6. The shroud of claim 4 wherein the opposing protuberant members are disposed in a mirrored relationship with respect to each other.

7. The shroud of claim 1 wherein the first arcuate protuberant member is substantially orthogonal to an outwardly directed fluid current at each of different radial locations, the outwardly directed fluid current created by the disc operably rotating in the shroud.

8. The shroud of claim 1 segmented into first and second portions that are each selectively moveable between an extended position whereat the shroud operably encompasses the disc and a retracted position whereat the shroud operably clears the disc.

9. The shroud of claim 8 wherein the protuberant members are in the first portion of the shroud, wherein additional protuberant members are in the second portion of the shroud.

10. The shroud of claim 1 comprising a third protuberant member depending from the plate surface and spaced from the disc by a fourth gap downstream of the third gap and smaller than the first gap the third protuberant member operably extending from adjacent the plate edge in a substantially radial direction across a portion of the disc.

11. The shroud of claim 10 wherein the third protuberant member is radially longer than the second protuberant member.

12. A method, comprising:
    admitting an outwardly directed fluid current created by a rotating disc into an inlet of a shroud encompassing both opposing planar surfaces and a contiguous edge of the disc in close mating engagements;
    passing a first portion of the outwardly directed fluid current from the inlet through a first gap between the shroud and the disc that is downstream of and smaller than the inlet, the first gap extending in a substantially radial direction of the disc from an end that is adjacent a distal edge of the shroud nearer an inner diameter of the disc; and redirecting a second portion of the outwardly directed fluid current, not included in the first portion, within an enlarged space between the shroud and the disc defined between the first gap and a second gap between the shroud and the disc that is downstream of the first gap and smaller than the inlet, the first gap creating a fluid pressure gradient at the second gap causing at least some of the second portion to migrate inwardly toward a relatively low pressure zone adjacent the distal edge of the shroud.

13. The method of claim 12 wherein the passing a first portion migrates at least some of the first portion to flow inwardly toward the low pressure zone.

14. The method of claim 12 wherein the enlarged space is a first enlarged space, further comprising redirecting a third portion of the outwardly directed fluid current, not included in the first and second portions, within a second enlarged space between the shroud and the disc defined between the second gap and a third gap between the shroud and the disc that is downstream of the second gap and smaller than the inlet, the second gap creating a fluid pressure gradient at the third gap causing at least some of the third portion to migrate inwardly toward the low pressure zone.

15. A shroud that attenuates an outwardly directed fluid current created by a rotating disc, the shroud comprising a plate terminating at a plate edge that is operably disposed between a center of the rotating disc and a peripheral edge of the rotating disc, the plate having a leading edge spaced from the rotating disc by a first gap forming an upstream inlet with respect to a rotational direction of the rotating disc, and the plate supporting a protuberant member spaced from the rotating disc by a second gap that is downstream of and smaller than the first gap, an end of the protuberant member disposed adjacent the plate edge and the protuberant member configured to extend substantially radially across a portion of the disc to operably create a fluid pressure gradient migrating some of the outwardly directed fluid current to flow inwardly across the disc.

16. The shroud of claim 15 wherein the protuberant member is a first protuberant member, further comprising the plate supporting a second protuberant member spaced from the disc by a third gap that is downstream of the second gap and smaller than the first gap, an end of the second protuberant member disposed adjacent the plate edge and the second protuberant member configured to extend substantially radially across a portion of the disc operably creating a fluid pressure gradient migrating some of the outwardly directed fluid current to flow inwardly across the disc.

17. The shroud of claim 16 wherein the second protuberant member extends radially longer across the disc than the first protuberant member.

18. The shroud of claim 16 wherein at least one of the protuberant members forms the respective gap substantially a distance from the disc, and wherein the protuberant member extends substantially radially in an arcuate direction.

* * * * *

UNITED STATES PATENT AND TRADEMARK OFFICE
CERTIFICATE OF CORRECTION

| | |
|---|---|
| PATENT NO. | : 8,885,288 B2 |
| APPLICATION NO. | : 11/957432 |
| DATED | : November 11, 2014 |
| INVENTOR(S) | : Xu Zuo and Xiaohong Sun |

It is certified that error appears in the above-identified patent and that said Letters Patent is hereby corrected as shown below:

In the Claims,

In Col. 10, Line 27
replace "substantially a"
with "substantially a constant"

Signed and Sealed this
Fourteenth Day of April, 2015

Michelle K. Lee
*Director of the United States Patent and Trademark Office*